(12) United States Patent
Latham

(10) Patent No.: US 8,100,315 B1
(45) Date of Patent: Jan. 24, 2012

(54) METHOD OF INSULATING AN EXHAUST DEVICE

(75) Inventor: Ruth Latham, Ann Arbor, MI (US)

(73) Assignee: Tennco Automotive Operating Company Inc., Lake Forest, IL (US)

( * ) Notice: Subject to any disclaimer, the term of this patent is extended or adjusted under 35 U.S.C. 154(b) by 0 days.

(21) Appl. No.: 13/179,982

(22) Filed: Jul. 11, 2011

(51) Int. Cl.
*B23K 31/02* (2006.01)
*B21D 51/00* (2006.01)

(52) U.S. Cl. .................. 228/101; 228/173.5; 228/178; 29/890

(58) Field of Classification Search .................. None
See application file for complete search history.

(56) References Cited

U.S. PATENT DOCUMENTS

| | | | | |
|---|---|---|---|---|
| 2,593,714 A * | 4/1952 | Robinson | ...... | 156/156 |
| 3,002,047 A * | 9/1961 | Mannella | ...... | 174/124 R |
| 4,102,785 A * | 7/1978 | Head et al. | ...... | 210/767 |
| 4,316,523 A * | 2/1982 | Boretti | ...... | 181/226 |
| 4,441,726 A * | 4/1984 | Uhl | ...... | 277/652 |
| 4,508,423 A * | 4/1985 | Winter et al. | ...... | 385/109 |
| 5,390,962 A * | 2/1995 | Sekiguchi et al. | ...... | 285/53 |
| 5,405,422 A * | 4/1995 | Ueda et al. | ...... | 55/282.3 |
| 5,670,756 A * | 9/1997 | Ohtaka et al. | ...... | 181/256 |
| 5,686,039 A * | 11/1997 | Merry | ...... | 264/259 |
| 5,992,560 A * | 11/1999 | Matsuoka et al. | ...... | 181/252 |
| 6,004,890 A * | 12/1999 | Ueda et al. | ...... | 442/136 |
| 6,017,498 A * | 1/2000 | Harding | ...... | 422/179 |
| 6,045,884 A * | 4/2000 | Hess et al. | ...... | 428/36.1 |
| 6,158,507 A * | 12/2000 | Rouse et al. | ...... | 166/228 |
| 6,230,748 B1 * | 5/2001 | Krawietz et al. | ...... | 138/121 |
| 6,435,861 B1 * | 8/2002 | Quick et al. | ...... | 431/328 |
| 6,739,495 B2 * | 5/2004 | Okamura et al. | ...... | 228/112.1 |
| 7,190,892 B2 * | 3/2007 | Kertesz | ...... | 392/480 |
| RE42,634 E * | 8/2011 | Shaughnessy | ...... | 181/294 |
| 2004/0003630 A1* | 1/2004 | Akers et al. | ...... | 66/197 |
| 2004/0009106 A1* | 1/2004 | Galligan et al. | ...... | 422/180 |
| 2004/0197242 A1* | 10/2004 | Holden et al. | ...... | 422/179 |
| 2005/0011569 A1* | 1/2005 | Della Putta et al. | ...... | 138/110 |
| 2005/0076505 A1* | 4/2005 | Marino, Jr. | ...... | 29/890 |
| 2007/0261914 A1* | 11/2007 | Wahlgren et al. | ...... | 181/252 |

FOREIGN PATENT DOCUMENTS

| | | | | |
|---|---|---|---|---|
| DE | 19961284 A | * | 7/2001 | |
| DE | 10153775 A | * | 5/2003 | |
| DE | 102005009462 A | * | 9/2006 | |
| JP | 57-201518 A | * | 12/1982 | |
| JP | 58-34022 A | * | 2/1983 | |
| WO | WO-9729316 A | * | 8/1997 | |

* cited by examiner

*Primary Examiner* — Kiley Stoner

(74) *Attorney, Agent, or Firm* — Wood, Phillips, Katz, Clark & Mortimer

(57) ABSTRACT

A method is provided for providing external insulation for an exhaust gas aftertreatment or acoustic device, including the steps of (a) securing an insulating blanket around the exterior of the device, (b) securing a sheet of foil around the insulating blanket, (c) interconnecting a plurality of wires into a sleeve oriented in an axial direction by knitting or interweaving, whereby extending the sleeve in the axial direction biases the sleeve radially inwardly, (d) positioning the wire sleeve around the foil sheet, (e) welding one end of the wire sleeve to the device adjacent one end of the insulating blanket, (f) pulling the other end of the sleeve in the axial direction to bias the sleeve radially inwardly sufficiently to apply a compressive force to the insulating blanket, and (g) welding the other end of the sleeve to the device adjacent the other end of the insulating blanket.

16 Claims, 3 Drawing Sheets

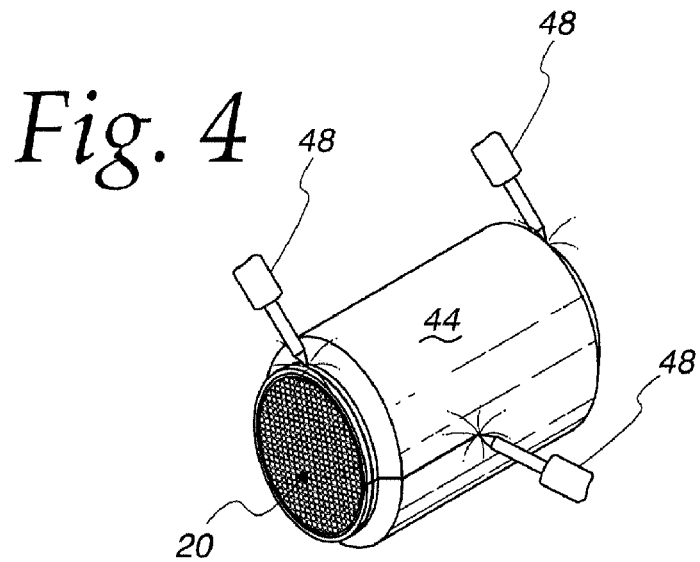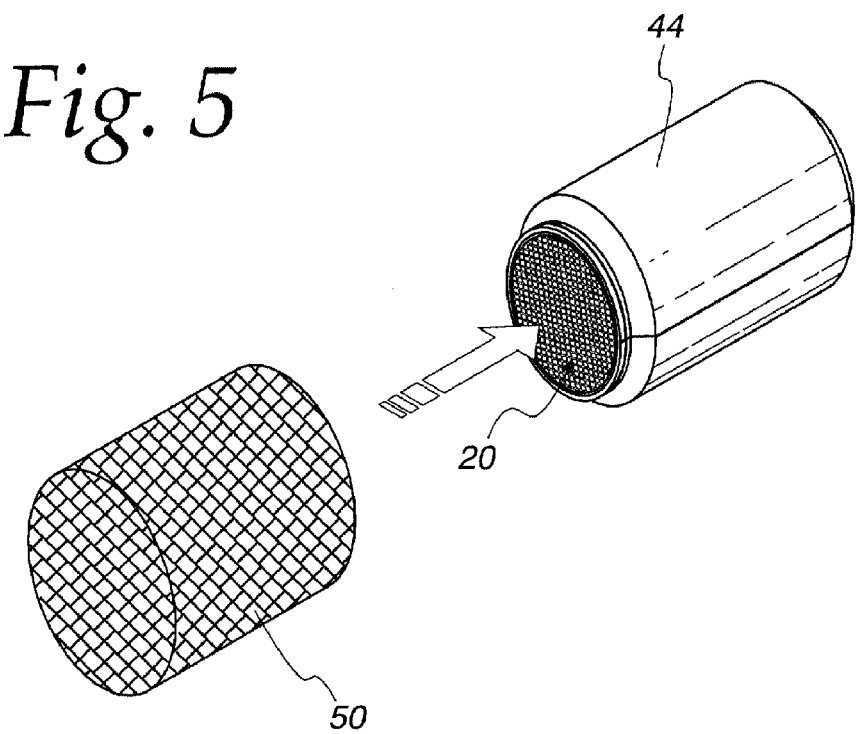

METHOD OF INSULATING AN EXHAUST DEVICE

CROSS-REFERENCE TO RELATED APPLICATIONS

Not applicable.

FEDERALLY SPONSORED RESEARCH OR DEVELOPMENT

Not Applicable.

MICROFICHE/COPYRIGHT REFERENCE

Not Applicable.

FIELD OF THE INVENTION

This invention relates to exhaust gas aftertreatment and/or acoustic systems and the devices used therein that utilize external insulation blankets.

BACKGROUND OF THE INVENTION

Heat insulating batts and blankets are utilized in exhaust gas systems in order to provide heat insulation for acoustic and aftertreatment devices of the system to control the heat exchange to and from the devices. It is known, for example, to place heat insulating blankets between adjacent wall surfaces of such devices with the material of the heat insulation blanket being compressed to provide a desired installed density for the material to help maintain the heat insulating blanket in its mounted position via frictional forces between the blanket and the adjacent wall surfaces. Such a structure is shown in U.S. Ser. No. 12/696,347, filed Jan. 29, 2010 by Keith Olivier et al., entitled "Method of Producing an Insulated Exhaust Device", the disclosure of which is hereby incorporated by reference. It is also known to provide heat insulation blankets around the exterior of such exhaust gas system devices.

The heat insulation properties of the blanket are dependent on, inter alia, the density of the blanket, and proper design of such devices requires that the density of the blanket be considered. It can, nonetheless, be difficult to ensure that the proper density/compression is provided and maintained for such blankets, particularly with external insulation blankets which are on the outer side of the devices.

The present invention is directed to overcoming one or more of the problems set forth above.

SUMMARY OF THE INVENTION

In one aspect of the present invention, a method of providing external insulation for an exhaust gas aftertreatment or acoustic device is provided, including the steps of (a) securing a sheet of insulating material around the device, (b) positioning a wire sleeve over the sheet and device, the wires of the sleeve being configured whereby axial extension of the sleeve biases the sleeve toward a smaller sleeve diameter, (c) securing one end of the sleeve adjacent one end of the sheet, (d) pulling the other end of the sleeve in an axial direction relative to the sleeve to bias the sleeve radially inwardly around the insulating material sheet, and (e) securing the other end of the sleeve adjacent the other end of the sheet.

In one form of this aspect of the present invention, the wires are woven together. In another form, the wires are knitted.

In another form of this aspect of the present invention, the sleeve pulling step includes pulling the other sleeve end sufficiently whereby the radially inward bias of the sleeve applies a compressive force to the insulating material.

Another form of this aspect of the present invention includes securing a sheet of foil around the insulating material sheet prior to the sleeve positioning step, wherein the wire sleeve is positioned over the foil sheet in the positioning step. In a further form, the foil sheet is stainless steel. In another further form, the foil sheet securing step includes welding the foil sheet around its edges to secure the foil sheet around the insulating material sheet.

In still another form of this aspect of the present invention, the securing steps comprise welding the wire sleeve to opposite ends of the insulated device.

In yet another form of this aspect of the present invention, the device has a metallic outer shell and the insulating material sheet securing step secures the insulating material sheet around the shell. In a further form, the device outer shell is substantially cylindrical and the sleeve pulling step includes pulling the other sleeve end sufficiently whereby the radially inward bias of the sleeve applies a substantially uniform compressive force to the insulating material.

In another aspect of the present invention, a method of providing external insulation for an exhaust gas aftertreatment or acoustic device is provided, including the steps of (a) securing an insulating blanket around the exterior of the device, (b) securing a sheet of foil around the insulating blanket, (c) interconnecting a plurality of wires into a sleeve oriented in an axial direction by a selected one of knitting or interweaving, whereby extending the sleeve in the axial direction biases the sleeve radially inwardly, (d) positioning the wire sleeve around the foil sheet, (e) securing one end of the wire sleeve adjacent one end of the insulating blanket, (f) pulling the other end of the sleeve in the axial direction to bias the sleeve radially inwardly sufficiently to apply a compressive force to the insulating blanket, and (g) securing the other end of the sleeve adjacent the other end of the insulating blanket.

In one form of this aspect of the present invention, the foil sheet is stainless steel.

In another form of this aspect of the present invention, the foil sheet securing step includes welding the foil sheet around its edges to secure the foil sheet around the insulating blanket.

In still another form of this aspect of the present invention, the securing steps comprise welding the wire sleeve at opposite ends of the insulating blanket.

In yet another form of this aspect of the present invention, the device has a metallic outer shell and the insulating blanket securing step secures the insulating material sheet around the shell. In a further form, the device outer shell is substantially cylindrical and the sleeve pulling step includes pulling the other sleeve end sufficiently whereby the radially inward bias of the sleeve applies a substantially uniform compressive force to the insulating material.

Other objects, features, and advantages of the invention will become apparent from a review of the entire specification, including the appended claims and drawings.

BRIEF DESCRIPTION OF THE DRAWINGS

FIG. 4 illustrates the step of securing the foil of FIG. 3 by welding its edges;

FIG. 5 illustrates the step of locating a wire sleeve over the blanket and foil of FIGS. 2 and 3 on the device of FIG. 1;

DETAILED DESCRIPTION OF THE PREFERRED EMBODIMENT

The present invention may be used, for example, in an exhaust gas system such as a diesel exhaust gas aftertreatment system to treat the exhaust from a diesel combustion process (e.g., a diesel compression engine). The exhaust will typically contain oxides of nitrogen ($NO_x$) such as nitric oxide (NO) and nitrogen dioxide ($NO_2$) among others, particulate matter (PM), hydrocarbons, carbon monoxide (CO), and other combustion by-products. The system may include one or more exhaust gas acoustic and/or aftertreatment devices or components. Examples of such devices include catalytic converters, diesel oxidation catalysts, diesel particulate filters, gas particulate filters, lean $NO_x$ traps, selective catalytic reduction monoliths, burners, manifolds, connecting pipes, mufflers, resonators, tail pipes, emission control system enclosure boxes, insulation rings, insulated end cones, insulated end caps, insulated inlet pipes, and insulated outlet pipes, all of any cross-sectional geometry, many of which are known.

As those skilled in the art will appreciate, some of the foregoing devices may be strictly metallic components with a central core through which the exhaust flows, and other of the devices may include a core in the form of a ceramic monolithic structure and/or a woven metal structure through which the exhaust flows. These devices are conventionally used in motor vehicles (diesel or gasoline), construction equipment, locomotive engine applications (diesel or gasoline), marine engine applications (diesel or gasoline), small internal combustion engines (diesel or gasoline), and stationary power generation (diesel or gasoline).

The present invention is directed toward providing proper insulation around the exterior of such devices, where the devices themselves have relatively hard outer shells, typically cylindrically shaped metal cans.

Figure 1:
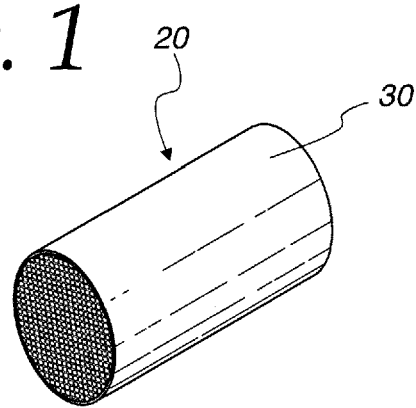
FIG. 1 is a perspective view of generally illustrating a cylindrical device, such as an exhaust gas aftertreatment or acoustic device, which may be insulated according to the present invention.

FIG. 1 in simplified form shows one example of a device 20 (e.g., a canned monolithic emission control component) for use in a system such as described above, in the form of a cylindrically shaped catalytic unit such as shown in Olivier et al. U.S. Ser. No. 12/696,347, the disclosure of which was heretofore incorporated by reference. As described therein, the device 20 may have a catalytic core, a mount mat, a cylindrical inner housing or can, a heat insulating blanket or batt, and a cylindrical outer housing 30. The outer housing 30 (or shell or jacket) is typically relatively stiff and cylindrical in shape, such as a metallic can. The core may typically be a ceramic substrate having a monolithic structure with a catalyst coated thereon and will typically have an oval or circular cross section. However, it should be appreciated that the details of the interior of the device 20 may be of any configuration suitable for systems as described above where external insulation of the device 20 is desired.

In accordance with the present invention, an external blanket 40 is wrapped around the outer housing 30 so as to substantially encapsulate the housing 30.

It should be understood that the present invention could be advantageously used with any blanket adapted to provide suitable insulation according to the needs of the device 20 and system in which it operates. For example, the blanket 40 could suitably be formed of silica, e-glass, calcined silica, polycrystalline, etc. Thus, while not limited thereto, one particular embodiment of a suitable external blanket 40 with which the invention may be advantageously used is made of a silica fiber insulation material having a weight percentage of $SiO_2$ of greater than 65%, and in preferred embodiments greater than 95%, and in highly preferred embodiments greater than 98%. Such material is known and commercially available, with one suitable example being supplied by BGF Industries, Inc. under the trade name SilcoSoft®, and another suitable example being supplied by ASGLAWO technofibre GmbH under the trade name Asglasil®. Such material is typically supplied in rolls, with the individual blankets 40 being die cut to the appropriate length and width for the corresponding device 20 after the material has been taken from the roll. In one preferred form, the blanket 40 may have an average installed density of 0.18 grams/cubic centimeter to 0.30 grams/cubic centimeter of the silica fiber insulation material of the blanket 40. The blanket 28 may also be heat treated to achieve calcination of the silica fiber insulation material.

Figure 2:
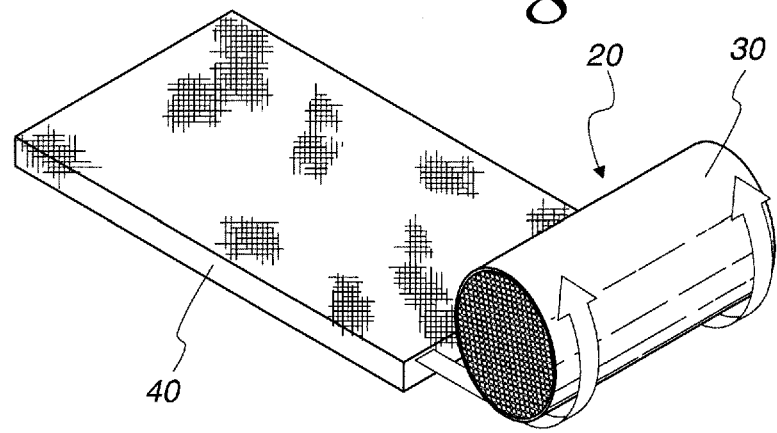
FIG. 2 illustrates the step of wrapping an external blanket around the FIG. 1 device.
Figure 3:
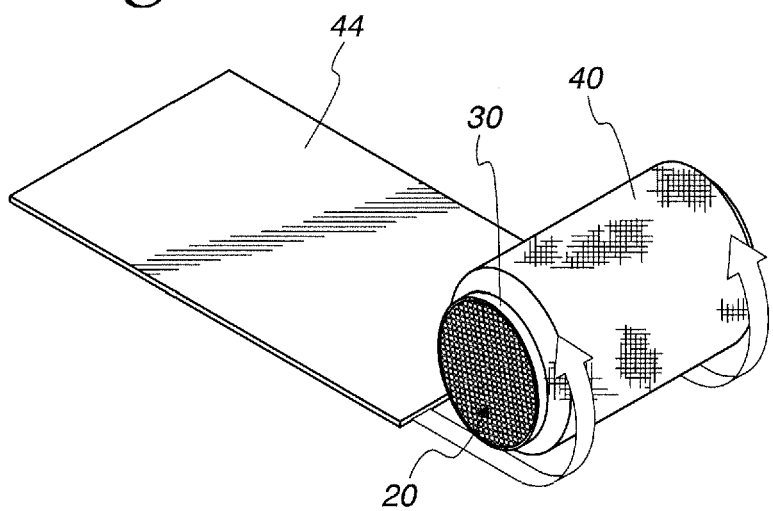
FIG. 3 illustrates the step of wrapping a foil around the FIG. 1 device wrapped in the external blanket shown in FIG. 2.

In accordance with one advantageous embodiment of the present invention, the external blanket 40 is suitably wrapped around the device 20 as indicated by the arrows in FIG. 2, and then suitably secured in place. Thereafter, a suitable covering 44, such as a sheet of stainless steel foil, is similarly wrapped around the external blanket 40 as indicated by the arrows in FIG. 3, with the covering 44 also suitably secured in place, for example, by welding the ends and seam as generally indicated by the welding tools 48 shown in FIG. 4.

A wire sleeve 50 is then positioned over the foil covering 44. The sleeve 50 consists of suitable wires which are knitted or woven together suitably to form a tubular sock-type structure open on both ends. The sleeve 50 has an unbiased inner diameter $T_{SLEEVE\ ID}$ which preferably is slightly greater than the outer diameter $D_{FOIL\ OD}$ of the foil covering 44 secured over the external blanket 40, enabling the wire sleeve 50 to be slid relatively easily over the foil covering 44 as illustrated by the arrow in FIG. 5.

The wires forming the sleeve 50 are suitably interconnected (e.g., by weaving or knitting) so that the sleeve 50 formed by the wires will be biased toward a smaller sleeve diameter when the sleeve 50 is extended (stretched) in an axial direction (e.g., the direction of the arrow in FIG. 5).

Figure 6:
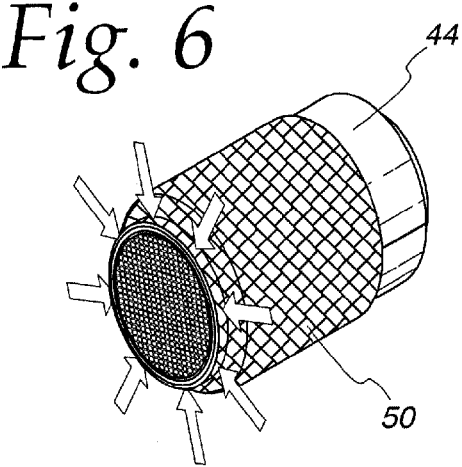
FIGS. 6-7 illustrates the step of securing one end of the wire sleeve of FIG. 5 to one end of the device of FIG. 1.
Figure 7:
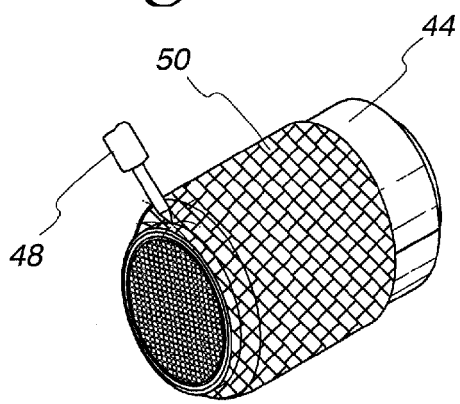

When the wire sleeve 50 is positioned over the foil covering 44 (see FIG. 6), one end of the sleeve 50 is compressed and suitably secured to one end of the device 20, for example, by welding (see FIG. 7).

Figure 9:
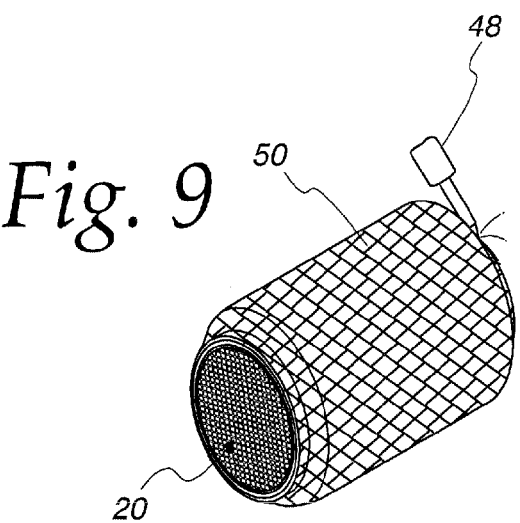
FIG. 9 illustrates the step of securing the other end of the wire sleeve to the other end of the device.

With one end of the wire sleeve 50 suitably secured to the device 20, a tension force is applied to the other end of the wire sleeve 50 to stretch the sleeve 50 axially (see arrows 52 in FIG. 9). Due to the previously described knitted/woven configuration of the wires forming the sleeve 50, such stretching causes the sleeve 50 to contract radially inwardly so that its inner diameter shrinks so as to be biased radially inwardly against the outer surface of the foil covering 44 to thereby provide tension on the foil covering 44.

Figure 8:
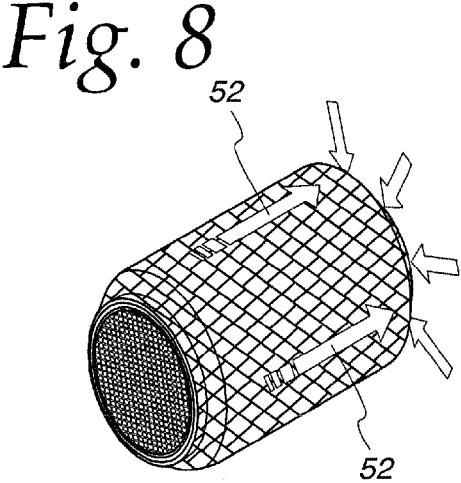
FIG. 8 illustrates the step of pulling the wire sleeve axially over the blanket and foil wrapped device of FIG. 8.

When the wire sleeve 50 is stretched so as to provide the desired tension on the foil covering 44, the opposite end of the sleeve 50 is compressed adjacent the other end of the blanket 40 (see FIG. 8) and suitably secured to the other end of the device 20 (e.g., by welding; see FIG. 9) so as to maintain the desired axial tension (and related radially inward bias).

When so assembled, it should be appreciated that the wire sleeve 50 will provide mechanical protection for the foil covering 44 and, in cooperation with the external blanket 40 and foil covering 44, will provide a permanent external insulation for the device 20. Further, the wire sleeve 50 will apply a tension around the foil covering 44, to help secure the foil covering 44 in the desired configuration and will also apply a small, substantially uniform compression through the foil covering 44 to the underlying external blanket 40 to ensure that the external blanket 40 remains suitably configured during use, notwithstanding the extensive vibration, movement and other forces to which it will be subjected.

It should also be appreciated that while the invention has been described herein in connection with a diesel combustion process in the form of, for example, a diesel compression engine, the invention may find use in devices that are utilized in exhaust gas systems for other types of combustion processes, including other types of internal combustion engines, including, for example, internal combustion engines that use gasoline or other alternative fuels.

The invention claimed is:

1. A method of providing external insulation for an exhaust gas aftertreatment or acoustic device, the method comprising the steps of:
   securing a sheet of insulating material around the device;
   positioning a wire sleeve over the sheet and device, said wires of said sleeve being configured whereby axial extension of said sleeve biases said sleeve toward a smaller sleeve diameter;
   securing one end of said sleeve adjacent one end of said sheet;
   pulling the other end of said sleeve in an axial direction relative to the sleeve to bias said sleeve radially inwardly around the insulating material sheet; and
   securing the other end of said sleeve adjacent the other end of said sheet.

2. The method of claim 1, wherein said wires are woven together.

3. The method of claim 1, wherein said wires are knitted.

4. The method of claim 1, wherein said sleeve pulling step includes pulling said other sleeve end sufficiently whereby said radially inward bias of said sleeve applies a compressive force to said insulating material.

5. The method of claim 1 further comprising securing a sheet of foil around the insulating material sheet prior to said sleeve positioning step, wherein said wire sleeve is positioned over said foil sheet in said positioning step.

6. The method of claim 5 wherein said foil sheet is stainless steel.

7. The method of claim 5 wherein said foil sheet securing step further comprises welding said foil sheet around its edges to secure said foil sheet around said insulating material sheet.

8. The method of claim 1 wherein the securing steps comprise welding the wire sleeve to opposite ends of the insulated device.

9. The method of claim 1 wherein the device has a metallic outer shell and the insulating material sheet securing step secures the insulating material sheet around said shell.

10. The method of claim 9 wherein said device outer shell is substantially cylindrical and said sleeve pulling step includes pulling said other sleeve end sufficiently whereby said radially inward bias of said sleeve applies a substantially uniform compressive force to said insulating material.

11. A method of providing external insulation for an exhaust gas aftertreatment or acoustic device, the method comprising the steps of:
    securing an insulating blanket around the exterior of said device;
    securing a sheet of foil around the insulating blanket;
    interconnecting a plurality of wires into a sleeve oriented in an axial direction by a selected one of knitting or interweaving, whereby extending said sleeve in the axial direction biases said sleeve radially inwardly;
    positioning said wire sleeve around the foil sheet;
    securing one end of said wire sleeve adjacent one end of said insulating blanket;
    pulling the other end of said sleeve in the axial direction to bias said sleeve radially inwardly sufficiently to apply a compressive force to said insulating blanket; and
    securing the other end of said sleeve adjacent the other end of said insulating blanket.

12. The method of claim 11 wherein said foil sheet is stainless steel.

13. The method of claim 11 wherein said foil sheet securing step further comprises welding said foil sheet around its edges to secure said foil sheet around said insulating blanket.

14. The method of claim 11 wherein the securing steps comprise welding the wire sleeve at opposite ends of the insulating blanket.

15. The method of claim 11 wherein the device has a metallic outer shell and the insulating blanket securing step secures the insulating blanket around said shell.

16. The method of claim 15 wherein said device outer shell is substantially cylindrical and said sleeve pulling step includes pulling said other sleeve end sufficiently whereby said radially inward bias of said sleeve applies a substantially uniform compressive force to said insulating blanket.

* * * * *

UNITED STATES PATENT AND TRADEMARK OFFICE
CERTIFICATE OF CORRECTION

| | | |
|---|---|---|
| PATENT NO. | : 8,100,315 B1 | Page 1 of 1 |
| APPLICATION NO. | : 13/179982 | |
| DATED | : January 24, 2012 | |
| INVENTOR(S) | : Ruth Latham | |

It is certified that error appears in the above-identified patent and that said Letters Patent is hereby corrected as shown below:

(73)    Assignee should read: Tenneco Automotive Operating Company Inc., Lake Forest, IL (US)

Signed and Sealed this

Thirty-first Day of July, 2012

David J. Kappos
*Director of the United States Patent and Trademark Office*